April 22, 1930.  R. R. BLOSS  1,756,009
BULL WHEEL BRAKE STRUCTURE
Filed Jan. 3, 1928  2 Sheets-Sheet 1
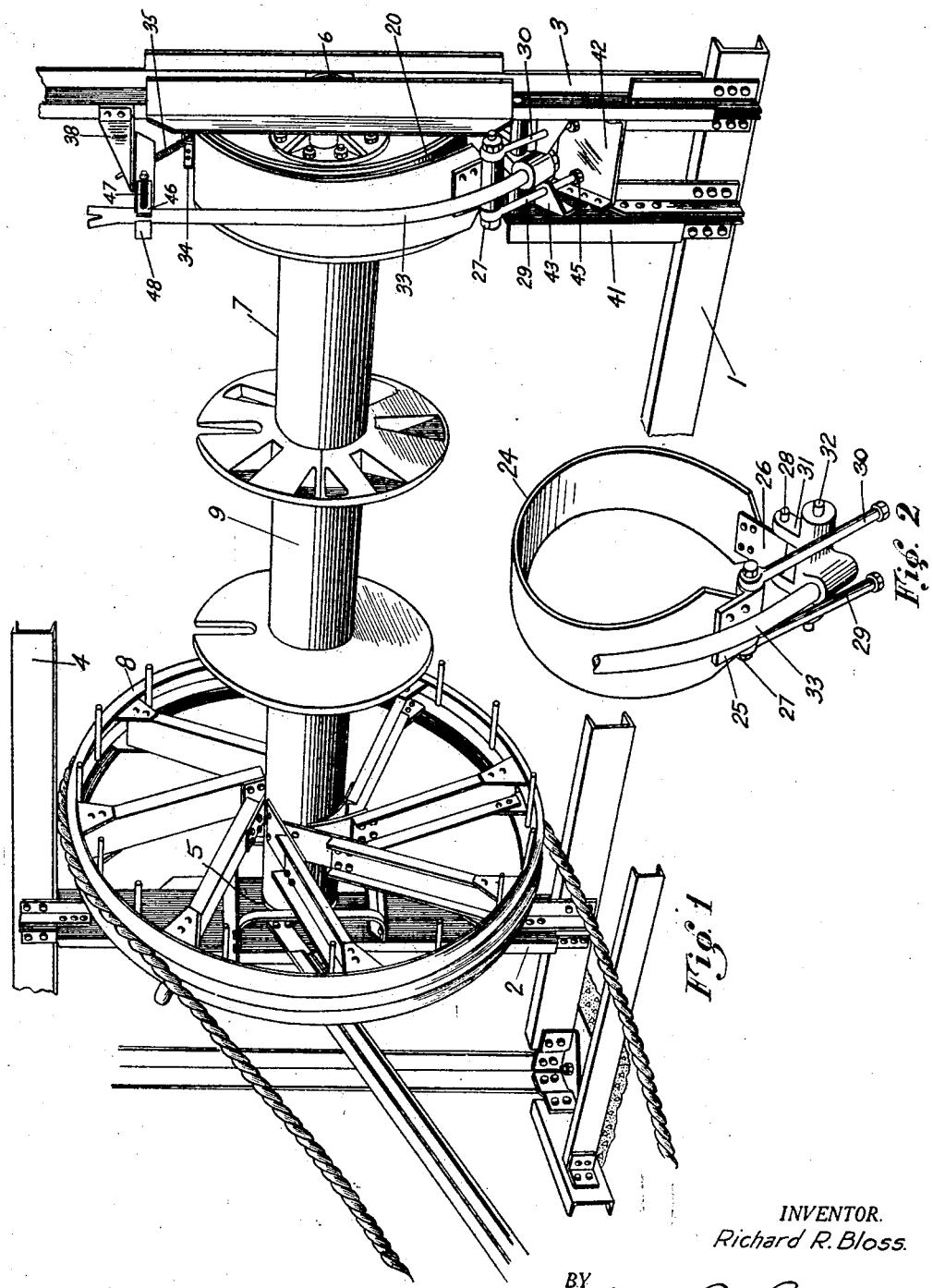
INVENTOR.
Richard R. Bloss.
BY
ATTORNEY.

April 22, 1930.   R. R. BLOSS   1,756,009
BULL WHEEL BRAKE STRUCTURE
Filed Jan. 3, 1928   2 Sheets-Sheet 2

INVENTOR.
Richard R. Bloss.
BY
Edwin P. Baker
ATTORNEY.

Patented Apr. 22, 1930

1,756,009

UNITED STATES PATENT OFFICE

RICHARD R. BLOSS, OF COLUMBUS, OHIO, ASSIGNOR TO THE INTERNATIONAL DERRICK & EQUIPMENT COMPANY, OF COLUMBUS, OHIO, A CORPORATION OF OHIO

BULL-WHEEL-BRAKE STRUCTURE

Application filed January 3, 1928. Serial No. 244,121.

My invention relates to bull wheel structure. It has to do primarily with a novel construction of bull wheel and supporting mechanism therefor, being particularly related to the supporting structure at the brake wheel end of the bull wheel.

In the past, it has been customary to utilize a bull wheel structure with a comparatively large brake wheel and with a brake band having the fulcrum of its operating lever mounted upon the derrick floor. The brake wheel has usually been provided with a braking surface made up of wooden cants and the consequent danger of fire has usually rendered it necessary to provide a water barrel or water piping close by so that water could be played upon the brake band and wheel constantly when in use. Likewise, the irregularity and the insecurity of the derrick floor as a supporting means for the ends of the brake band have necessitated expanding the band several inches to ensure its being out of contact with the braking surface of the wheel when in inoperative position. Other disadvantages of these structures will appear by a comparison as this description progresses.

One of the objects of my invention is the provision of my bull wheel structure wherein the brake wheel and brake band lever are mounted upon one bull wheel post, so that a unitary structure is formed and so that the brake drum, brake band and leverage mechanism may be readily given an accurate relation to each other, irrespective of the rest of the derrick structure.

Another object of my invention is the provision of a brake lever of novel and superior form, together with a brake band supporting mechanism designed to reduce lost motion to a minimum.

Another object of my invention is to provide a brake wheel structure constructed to neutralize and render harmless any heating action that may arise from severe braking actions that must inevitably occur in the varying positions of operation to which a device of this type is subjected. The principal step which I have taken to accomplish this last object is the provision of an annular rim which carries a braking surface and which is expansible, under the heat produced by braking, independently of the drum upon which it is mounted. However, other parts of my invention may be used without this feature of the independently expansible rim, and the braking rim may be rigidly related to the drum. In fact it may be formed integrally therewith.

This application is a continuation in part of my application filed May 29, 1926, Serial No. 112,655, bull wheel structure, now Patent No. 1,696,664, December 25, 1928.

The preferred embodiment of my invention is shown in the accompanying drawings wherein similar characters of reference designate corresponding parts and wherein:

Figure 1 is a perspective view of my bull wheel structure.

Figure 2 is a perspective view of the brake band removed from the brake wheel and showing the operating mechanism therefor connected thereto.

Figure 3:
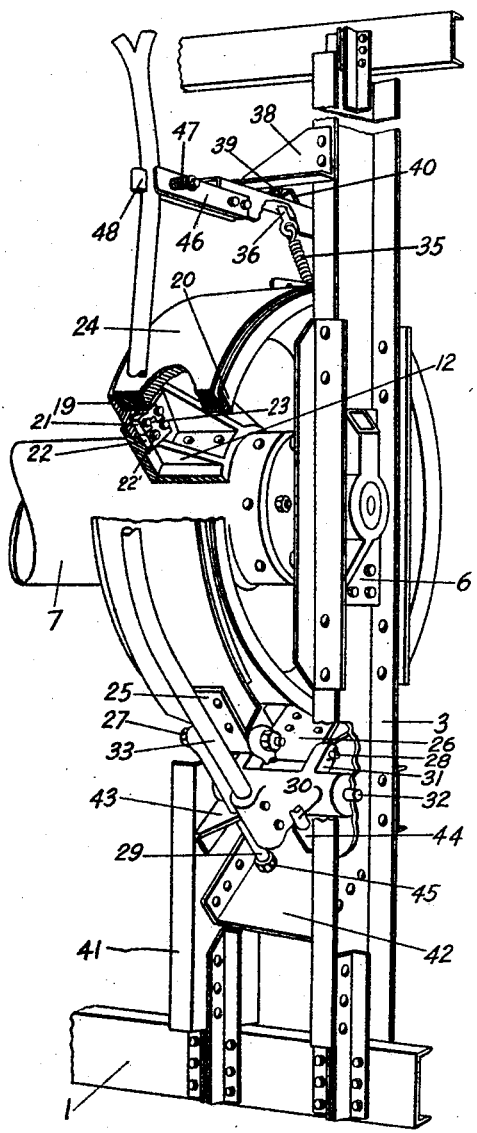
Figure 3 is a perspective view of the brake wheel end of the bull wheel and the post structure upon which it is mounted.
Figure 4:
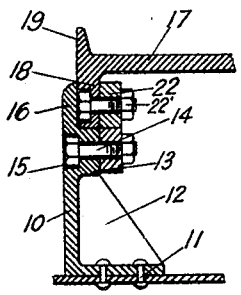
Figure 4 is a detail in section of a portion of my annular rim shown in its relation to the drum upon which it is expansibly mounted.
Figure 5:
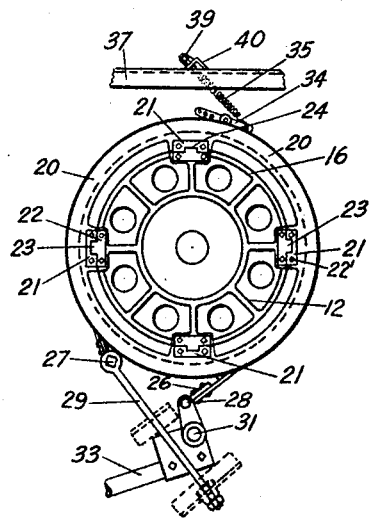
Figure 5 is a side elevation of my brake wheel with the band mounted thereon and showing the leverage mechanism for operating this band.

In the drawings, one of the base sills of the derrick structure is shown at 1. Extending upwardly from said base sill, and adjacent one end thereof, is a vertical member 2. Extending upwardly from adjacent the opposite end thereof is a vertical member of a post 3. The members 2 and 3 are connected at their upper end by a cross member 4. These members and the cross member are preferably made of channel iron.

The member 2 is designed to receive a bearing 5 and the member 3 is designed to receive a bearing 6. These bearings 5 and 6 are arranged to support the gudgeons of the bull wheel shaft, the gudgeons being removable if desired.

Adjacent to the bearing 5, the bull wheel shaft 7 carries a tug rim 8 and intermediate its length it carries a spool 9.

Adjacent to the bearing 6, this shaft carries a hub member 10 in the form of an annulus which is L-shaped in cross section so as to provide a flange 11 to be riveted to the bull wheel shaft and a radially extending portion. The radially extending portion carries a plurality of cooling fins 12 and, at spaced intervals, it is provided on its outer surface with lugs 13 apertured for the reception of bolts 14. The heads of these bolts 14 are set into the surface of the hub as at 15. The hub is further provided upon its outer surface with an annular flange 16.

Mounted upon the hub member 10 and carried by the annular flange 16 is an annular rim 17 having an inwardly extending flange 18 and having outwardly extending edge flanges 19 and 20. These edge flanges form a channel for the brake band which is adapted to be disposed between them.

The annular rim 17 is expansibly held in position upon the hub member 10 through the medium of interlocking keeper members 21 and 22, the former being carried by the hub member and the latter being carried by the annular rim member 17 though the medium of bolts 22'. The keeper members 21 are secured to the hub member 10 by bolts 14 and they are provided with radially extending tongues 23. When these keeper members 21 are bolted in operative position, their tongues 23 project radially into such overlapping relation wth the flange 18 of the annular rim member 17 to a sufficient extent to prevent the annular member 17 from moving laterally with relation to the hub member 10.

The keeper members 21 are in vertical alignment with the keeper members 22 and they are provided with grooves or sockets 24 which receive and embrace the tongues 23 of the members 21. When bolted in this operative position, they prevent relative rotation of the rim member 17 and the hub member 10. The locking relation is such that the rim member 17 is free to expand and move radially away from the flange 16 of the hub member 10 to a limited extent, while, at the same time, the parts are held against complete separation and must rotate together.

The brake band is shown as comprising a strap member 24 having end pieces 25 and 26. These end pieces 25 and 26 are curled at their outer extremities to receive connecting rods 27 and 28. The connecting rod 27 carries, upon its ends, links 29 and 30. The connecting rod 28 is connected to the bifurcated arm 31 of a bell crank lever whose fulcrum is designated 32 and which is provided with a handle 33. It will be noted that the handle 33 is curved so that it may move upwardly into close relation to the brake wheel and brake band structure. The brake band is normally supported out of contact with the brake wheel by means of a link 34 and a coil spring 35 connected by means of a bolt 36 which extends through a rod 37 carried by means of flange members 38 upon the upright member 3 and adjacent the upper end thereof. The effectiveness of the coil spring 35 may be varied through the medium of the nuts 39 bearing against the element 40.

The upright member 3 forms only a part of the post which carries the brake band and operating mechanism. A supplementary part of this post takes the form of a short upright 41 carried by the sill 1 and in spaced relation to the member 3. Located in between 3 and 41 and preferably riveted thereto is an inclined member 42. Immediately above this member and in spaced relation thereto are inclined members 43 and 44. The links 29 and 30 pass through the members 43 and 44 and are adjustably secured to the member 42 by means of nuts 45. The fulcrum 32 of the lever is journaled at one end in the upright 3 and at the other end in the upright 41.

The member 37 which is carried upon the upper end of the upright 3 in the manner previously described carries a latch member 46 which is of bifurcated form and has its legs held together resiliently by means of the spring 47. One of these legs is provided with a keeper 48. Such latch member is adapted to receive and retain the upper end of the brake handle 33 in inoperative position or in such position that the brake handle is ineffective to operate the braking mechanism.

From this description it will be seen that I have provided a bull wheel hoist which is of extremely simple and rigid construction and which is provided with a number of obviously advantageous features. For instance, the brake band and the operating mechanism therefor are all carried by one post. Thus, it is possible to utilize a much smaller brake wheel and to accurately position the brake wheel, the brake band and the brake band operating parts in such relation to each other as to ensure a maximum efficiency of operation. Furthermore, the curved lever construction makes it possible to position the lever in the center of the periphery of the brake wheel, so that the leverage action may be applied to the brake band directly in alignment therewith and yet the lever may be readily moved up out of the way when in inoperative position.

Likewise, the brake band is of such a structure that it is reversible, end for end, to compensate for wear. Experience has shown that brake band in this type of service will wear faster on one end than on the other. My brake band can be reversed in a very short period of time and the result is that its longevity is greatly increased.

It will be obvious that my expansible metal rim of annular form eliminates the necessity of maintaining a water barrel or water piping, freezing of water and ice on derrick floor in cold weather et cetera. Thus, considerable cost can be saved while, at the same time, all danger of fire hazard due to the wooden cants igniting is eliminated. Likewise, the elimination of the wooden cants, which vary in specific gravity, results in a better balanced structure.

Another feature of advantage of my invention arises from the fact that I require less room for the installation and this results in more room on the derrick floor. Likewise, the mounting of the brake lever upon one bull wheel post gives greater braking room, owing to the definite predetermined location that can be obtained as against mounting the leverage mechanism on the derrick floor. Furthermore, this characteristic of my structure, by reducing the necessary expansion of the brake band, increases the braking power obtainable within the range of practical length of brake levers, while the accurate arrangement of my parts permits of an increased power ratio between the weight arm and the force arm of the lever, cutting down the amount of band as explained, and thereby multiplying the available power.

Having thus described my invention, what I claim is:

1. Bull wheel structure comprising a bull wheel shaft, a brake wheel on one end of said shaft, a brake band, spaced tie-rods for one end of said brake band, a lever connected to the other end of said brake band and operating in between said spaced tie-rods, and a latch member disposed above said brake wheel for maintaining said lever in inoperative position.

2. A post structure for a bull wheel hoist comprising a substantially vertical standard for supporting the bull wheel shaft and a shorter substantially vertical standard, said two standards being spaced and adapted to receive the fulcrum of a brake band operating lever.

3. Bull hoist structure comprising a brake wheel, a post structure carrying the brake wheel end of the bull hoist shaft, a brake band, and mechanism for operating said brake band supported entirely on said post structure.

4. Bull hoist structure comprising a bull wheel shaft, a brake wheel carried by said shaft, a post structure carrying the brake wheel end of said shaft, a brake band, and mechanism for supporting and operating said brake band, said mechanism being supported entirely by said post structure.

5. Bull hoist structure comprising a bull wheel shaft, a brake wheel carried by said shaft, a brake band, a post structure carrying the brake wheel end of said shaft, and mechanism for supporting said brake band, said mechanism being supported entirely by said post structure.

6. A brake wheel structure comprising a brake wheel, a brake band, a means for holding said brake band away from said brake wheel, said means being located above said brake wheel, a leverage mechanism located beneath said brake wheel, and means for latching said leverage mechanism in inoperative position.

7. Brake wheel structure comprising a hub member, an expansible rim mounted upon said hub member, means for preventing the lateral movement of said rim upon said hub member, and means for preventing relative rotation of said hub member and said rim, a brake band, means for holding said brake band away from said rim, said means being disposed above said rim, a leverage mechanism disposed beneath said rim for moving said band into contact with said rim, and means for latching said leverage mechanism in inoperative position.

8. Bull wheel structure comprising a bull wheel shaft, a brake wheel carried by said shaft, a brake band, a post structure for supporting the operating mechanism for said brake band, said post structure comprising spaced standards and an inclined plate between said standards to which one end of said brake band is connected.

9. Bull wheel structure comprising a bull wheel shaft, a brake wheel carried by said shaft, a brake band, a post structure for supporting the operating mechanism for said brake band, said post structure comprising spaced standards and an inclined member between said standards, spaced tie-rods connected to one end of said brake band and to said inclined member, and an operating lever mounted in between said tie-rods with its fulcrum carried by said standards.

In testimony whereof I hereby affix my signature.

RICHARD R. BLOSS.